(12) United States Patent
Janik et al.

(10) Patent No.: US 12,286,204 B2
(45) Date of Patent: Apr. 29, 2025

(54) HYBRID POWER GENERATION PLANT SYSTEM AND METHOD

(71) Applicant: ELECTRONIC POWER DESIGN, INC., Houston, TX (US)

(72) Inventors: John Bradford Janik, Houston, TX (US); Berry Justin Rowden, Magnolia, TX (US); Charles Sutherland, Houston, TX (US); Prince Varghese, Houston, TX (US); Felix Gonzalez, Katy, TX (US)

(73) Assignee: Electronic Power Design, Inc., Houston, TX (US)

( * ) Notice: Subject to any disclaimer, the term of this patent is extended or adjusted under 35 U.S.C. 154(b) by 648 days.

(21) Appl. No.: 17/485,062

(22) Filed: Sep. 24, 2021

(65) Prior Publication Data

US 2022/0081091 A1    Mar. 17, 2022

Related U.S. Application Data

(63) Continuation-in-part of application No. 16/458,359, filed on Jul. 1, 2019, now Pat. No. 11,333,085.

(60) Provisional application No. 63/083,058, filed on Sep. 24, 2020.

(51) Int. Cl.
*B63H 21/20* (2006.01)
*B63H 21/21* (2006.01)

(52) U.S. Cl.
CPC .............. *B63H 21/20* (2013.01); *B63H 21/21* (2013.01); *B63H 2021/205* (2013.01)

(58) Field of Classification Search
None
See application file for complete search history.

(56) References Cited

U.S. PATENT DOCUMENTS

| 5,319,556 A | * | 6/1994 | Bessacini | F41G 7/228 |
| | | | | 114/238 |
| 5,898,282 A | * | 4/1999 | Drozdz | B60L 15/2045 |
| | | | | 318/368 |
| 7,034,414 B1 | * | 4/2006 | Foerg | H02J 9/06 |
| | | | | 290/1 A |
| 8,271,175 B2 | * | 9/2012 | Takenaka | B62D 6/003 |
| | | | | 701/72 |
| 8,662,220 B2 | * | 3/2014 | Burkholder | B60W 10/30 |
| | | | | 180/65.285 |

(Continued)

*Primary Examiner* — Jonathan M Dager
(74) *Attorney, Agent, or Firm* — G. Michael Roebuck, PC (57) ABSTRACT

A hybrid power generation plant system and method are disclosed, the system including but not limited to a plurality of diesel engines; an electrical bus switchably attached to the diesel engines, batteries switchably attached to the electrical bus; a tug boat propulsion load attached to the electrical bus; a diesel engine and a battery; a processor the executes a computer program; instructions to determine a current system load serviced by power provided from the hybrid power source; instructions to determine a current operating state for the diesel engine and the battery; instructions to determine a new operating state for the diesel engine and the battery to reduce power consumption servicing the current system load the diesel engine and the battery; and instructions to replace the current operating state for the diesel engine and the battery to the new operating state for the diesel engine and the battery.

16 Claims, 3 Drawing Sheets

(56) References Cited

U.S. PATENT DOCUMENTS

| | | | | |
|---|---|---|---|---|
| 8,670,888 B1* | 3/2014 | Brenner | B60L 58/12 | 903/917 |
| 8,992,274 B1* | 3/2015 | Ward | B63H 21/20 | 440/87 |
| 9,129,456 B2* | 9/2015 | Keates | F02D 35/025 | |
| 9,836,574 B2* | 12/2017 | Willard | B60K 35/60 | |
| 11,273,719 B2* | 3/2022 | Mikalsen | B60L 53/63 | |
| 11,305,843 B2* | 4/2022 | Hovde | B63B 27/18 | |
| 11,697,986 B2* | 7/2023 | Zheng | H02J 13/00002 | 307/19 |
| 2003/0107030 A1* | 6/2003 | Sozzi | B66D 1/12 | 254/362 |
| 2004/0030469 A1* | 2/2004 | MacBain | B60W 10/08 | 180/65.25 |
| 2004/0034460 A1* | 2/2004 | Folkerts | B60W 50/0097 | 701/54 |
| 2004/0074682 A1* | 4/2004 | Fussey | B60K 6/105 | 903/903 |
| 2006/0066146 A1* | 3/2006 | Otomo | B60T 13/147 | 303/151 |
| 2006/0208570 A1* | 9/2006 | Christian | B60K 6/46 | 307/10.1 |
| 2009/0105896 A1* | 4/2009 | Tamai | B60K 6/365 | 701/99 |
| 2009/0198396 A1* | 8/2009 | Rodriguez | B60W 30/1882 | 701/22 |
| 2009/0227417 A1* | 9/2009 | Imamura | B60W 10/06 | 701/58 |
| 2010/0094490 A1* | 4/2010 | Alston | B63J 3/02 | 290/40 C |
| 2010/0125383 A1* | 5/2010 | Caouette | B63J 3/00 | 701/21 |
| 2011/0074165 A1* | 3/2011 | Grimes | F02D 41/1446 | 290/40 C |
| 2011/0281478 A1* | 11/2011 | Blumenthal | B63B 35/44 | 440/49 |
| 2012/0001479 A1* | 1/2012 | Harpin | B63H 21/17 | 307/9.1 |
| 2012/0028515 A1* | 2/2012 | Stasolla | B63H 23/10 | 440/3 |
| 2012/0083173 A1* | 4/2012 | McMillan | B63H 21/20 | 903/930 |
| 2012/0101671 A1* | 4/2012 | Caouette | B63H 21/21 | 180/65.265 |
| 2012/0239228 A1* | 9/2012 | Vos | B60K 6/42 | 701/1 |
| 2012/0309242 A1* | 12/2012 | Haugland | B63J 3/02 | 440/3 |
| 2013/0190956 A1* | 7/2013 | Zhamu | B60W 20/00 | 180/65.245 |
| 2013/0241444 A1* | 9/2013 | Fotherby | H02J 3/34 | 318/400.26 |
| 2013/0274967 A1* | 10/2013 | Tan | B60W 20/11 | 903/915 |
| 2013/0307444 A1* | 11/2013 | Settemsdal | B60L 7/14 | 318/139 |
| 2013/0313894 A1* | 11/2013 | Settemsdal | B60R 16/033 | 307/9.1 |
| 2013/0325214 A1* | 12/2013 | Vos | B60W 20/13 | 903/903 |
| 2014/0148304 A1* | 5/2014 | Pietron | B60W 10/02 | 180/65.265 |
| 2014/0187107 A1* | 7/2014 | Gemin | B63B 35/66 | 903/902 |
| 2014/0239871 A1* | 8/2014 | Savva | B63B 21/22 | 254/362 |
| 2014/0257615 A1* | 9/2014 | Tan | B60W 10/06 | 180/65.265 |
| 2015/0134162 A1* | 5/2015 | Yamazaki | B60W 30/182 | 903/906 |
| 2015/0239546 A1* | 8/2015 | Limseth | B63H 21/21 | 440/6 |
| 2016/0006275 A1* | 1/2016 | Lee | B60L 58/12 | 320/112 |
| 2016/0009530 A1* | 1/2016 | Teruzzi | H02G 11/02 | 191/12 R |
| 2016/0036308 A1* | 2/2016 | Bailey | B63H 21/20 | 310/91 |
| 2016/0052397 A1* | 2/2016 | Meyer | B60L 58/12 | 701/123 |
| 2016/0114861 A1* | 4/2016 | Janik | B66D 1/12 | 254/362 |
| 2016/0114862 A1* | 4/2016 | Janik | B66D 1/505 | 254/362 |
| 2016/0159625 A1* | 6/2016 | Janik | B66D 1/485 | 700/282 |
| 2016/0207404 A1* | 7/2016 | Melz | B60W 10/08 | |
| 2016/0347421 A1* | 12/2016 | Janik | B66D 1/60 | |
| 2017/0203660 A1* | 7/2017 | He | B60L 58/14 | |
| 2017/0211251 A1* | 7/2017 | Janik | E02B 17/021 | |
| 2017/0234250 A1* | 8/2017 | Janik | F02D 25/00 | 700/286 |
| 2017/0302218 A1* | 10/2017 | Janik | B63B 21/50 | |
| 2018/0062388 A1* | 3/2018 | Mathiesen | H02J 3/28 | |
| 2018/0334177 A1* | 11/2018 | Myers | F02D 19/023 | |
| 2019/0173295 A1* | 6/2019 | Morin | H02J 7/00038 | |
| 2019/0176951 A1* | 6/2019 | Ulliman | B63H 21/21 | |
| 2020/0039623 A1* | 2/2020 | Mikalsen | B63H 21/20 | |
| 2020/0277035 A1* | 9/2020 | Fan | B63H 21/17 | |
| 2020/0313254 A1* | 10/2020 | Gray | H01M 10/425 | |
| 2021/0403135 A1* | 12/2021 | Schulz | B63H 21/20 | |
| 2024/0025527 A1* | 1/2024 | Bangslund | B63B 23/06 | |
| 2024/0113523 A1* | 4/2024 | Van Ravens | H02J 3/32 | |

* cited by examiner

FIG. 3

HYBRID POWER GENERATION PLANT SYSTEM AND METHOD

CROSS REFERENCE TO RELATED APPLICATIONS

This patent application claims priority from U.S. provisional patent application Ser. No. 63/083,058 entitled Hybrid Power Plant System and Method by John Janik filed on Sep. 24, 2020, which is hereby incorporated by reference herein in its entirety and pending U.S. patent application Ser. No. 16/458,359 entitled System and Method for Energy Management Using Linear Programming by Janik filed on Jul. 1, 2019, which is hereby incorporated by reference herein in its entirety. This patent application claims priority from U.S. Provisional Patent Application No. 62/286,705 by John B. Janik, entitled "System and Method for Energy Management Using Linear Programming", filed on Jan. 25, 2016, and claims priority from U.S. patent application Ser. No. 14/558,489 filed on Dec. 2, 2014, now U.S. Pat. No. 9,365,265 by John B. Janik, issued on May 25, 2016 and entitled "Hybrid Winch with Controlled Release and Torque Impulse Generation" and claims priority from U.S. Provisional Patent Application No. 62/297,636 filed on Feb. 19, 2016 by John B. Janik entitled SYSTEM AND METHOD FOR HYBRID POWER GENERATION, all three of which are hereby incorporated by reference herein in their entirety. Also incorporated by reference herein are U.S. Pat. No. 9,802,679 B2 Hybrid Winch with Controlled Release and Torque Impulse Generation Control for Anchor Handling Offshore by Janik; U.S. Pat. No. 9,923,370 B2 Hybrid Winch with Controlled Release and Torque Impulse Generation Control for Anchor Handling Offshore by Janik; U.S. Pat. No. 10,337,424 System and Method for Energy Management Using Linear Programming by Janik; and U.S. Pat. No. 10,541,536B2 System and Method for Mechanical Load Balancing Using Generator Droop Frequency based on Motor Load Feedback by Rowden.

BACKGROUND OF THE INVENTION

In the past tug boats have used diesel power for propulsion. There is a need for a cleaner and more efficient system and method for power generation.

FIELD OF THE INVENTION

The present invention relates to hybrid power generation for a tug boat.

BRIEF DESCRIPTION OF THE DRAWINGS

The invention will be better understood in reference to the following drawings, which are examples of an illustrative embodiment and are not limiting as different embodiments of the invention may be realized.

SUMMARY OF THE INVENTION

A hybrid tug boat power plant system and method is disclosed.

DETAILED DESCRIPTION OF THE INVENTION

In one particular illustrative embodiment of the invention a hybrid power generation plant system is disclosed including but not limited to a processor; a hybrid power source for servicing a system load on a tug boat, the hybrid power source including but not limited to a diesel engine; a computer program comprising instructions to determine a current system load serviced by power provided from the hybrid power generation plant; instructions to determine a current operating state for the diesel engine and the battery; instructions to use linear programming to determine an more efficient operating state for the diesel engine and the battery to reduce for power consumption servicing the current system load the diesel engine and the battery; and instructions to replace the current operating state for the diesel engine and the battery with the more efficient operating state for the diesel engine and the battery. A method is disclosed for using the hybrid power generation plant system. In another illustrative embodiment of the invention, several types of stored energy DC power source batteries are added to the hybrid power generation system as another energy source to be used to provide energy.

The present invention provides a controller having a "Linear Algebra" (also referred to as herein as "Linear" and "Linear Programming") computer program stored in a non-transitory computer readable medium, wherein the Linear Algebra, or the solutions to simultaneous non-equalities, to yield substantially improved efficiency and substantially least efficiency solutions to active Energy Management. In an illustrative embodiment of the invention a system and method provides a substantially most efficient use of the discharging of stored energy devices, diesel engine generator power and total and partial energy consumption and management. In another particular embodiment the computer program is standard or non-linear computer program comprising instructions that are executed by the processor.

In another particular illustrative embodiment, a controller having a linear programming computer program is provided for controlling the combined use of diesel engines and battery power stored in a battery for energy for management in supplying energy to a system load being serviced by a combination of the diesel engine and the battery power. The linear programming computer program determines a current system load being serviced by the diesel engines and battery power and determines a current load on each one of the diesel engine and the battery power. The linear programming system adjusts the usage of each of the diesel engine and battery power for economically servicing the system load. The linear programming system adjusts the usage of each of the diesel engines and battery power for reducing the power used for servicing the system load. A method is disclosed for using the linear programming energy management system.

A tutorial and description of the use of linear programming that can be adapted and used in one particular illustrative embodiment of the present invention is described in the book Linear programming, by Vasek Chvatal, W. H. Freeman and Company, New York, 1983. An example how to use of using linear programming to find an optimal fuel mixture for each generator at each time period and under each scenario using linear programming; and repeating the previous two steps as long as the fuel mixture obtained from the linear programming solution changes is shown in U.S. Pat. No. 6,021,402 to Takriti, which is hereby incorporated herein by reference in its entirety. An example of an energy management system that uses an expert system as an energy management system uses an expert engine and a numerical solver to determine an optimal manner of using and controlling the various energy consumption, producing and storage equipment in a plant/communities in order to for example reduce energy costs within the plant, and is especially applicable to plants that require or that are capable of using and/or producing different types of energy at different times. The energy management system operates the various energy manufacturing and energy usage components of the plant to minimize the cost of energy over time, or at various different times, while still meeting certain constraints or requirements within the operational system, such as producing a certain amount of heat or cooling, a certain power level, a certain level of production, etc. in U.S. Pat. No. 9,335,748 to Francino, which is hereby incorporated herein by reference in its entirety. In another particular illustrative embodiment of the invention, the Load Sharing Processor, which is part of the MPS, and PMS and the hybrid power generation plant system of the present invention is programmed as an expert system to perform energy management as described herein. In another particular illustrative embodiment of the invention, the Load Sharing Processor of the present invention is programmed as a neural network to perform energy management as described herein. In another particular illustrative embodiment of the invention, the Load Sharing Processor of the present invention is programmed as a computer program to perform energy management as described herein.

In a particular illustrative embodiment of the invention, a system and method provide a solution by adding a battery to the system with a DC-AC converter to allow fast transient response of the electrical system while solely operating with the diesel engine-generator.

Diesel fuel engines run on diesel. Continuously running the diesel engine during preload both wastes diesel fuel and shortens the life of the diesel engine as it is worn out from running all the time during preload.

Figure 1:
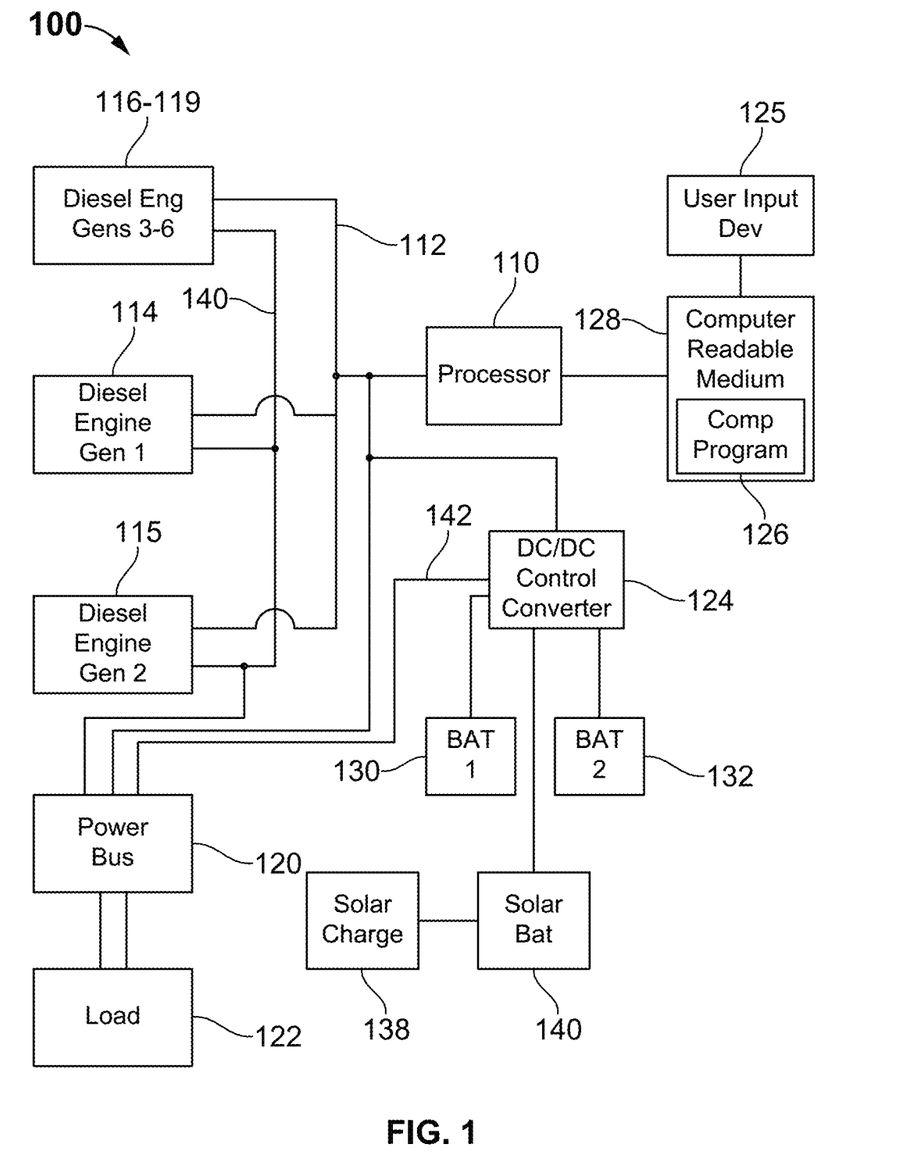
FIG. 1 depicts a schematic representations of a particular illustrative embodiment of the invention as a hybrid power generation system provided using a computer program for energy management.

FIG. 1 depicts a particular illustrative embodiment of the invention as a system provided using a computer program for energy management. The computer program is a linear program. In another illustrative embodiment, the computer program can be but is not limited to a neural network and an expert system. Turning now to FIG. 1, in a particular illustrative embodiment of the invention, a bank of diesel engine generators 114-119 is combined with a and a pair of lithium batteries 130 and 132. In another particular illustrative embodiment of the invention two diesel fuel engine generators are combined with a battery. These illustrative embodiments of systems in the present invention are controlled by a processor in the hybrid power generation plant system using linear programming to achieve a high efficiency of use between the engine generators and the battery. In another embodiment a neural network is used to achieve a high efficiency of use between the engines and the battery. In another embodiment an expert system is used to achieve a high efficiency of use between the engine generators and the battery. In another embodiment a computer program is used to achieve a high efficiency of use between the diesel engine generators and the batteries.

In the hybrid diesel power generation plant for a tug boat, diesel engine generators and DC power batteries are provided to provide high power generation capacity to handle high instantaneous torque requirements and long duty cycle ongoing power requirements. In another embodiment the DC power converter to the batteries are provided with a Diesel Generator (also referred to as "Diesel Engine Generators"). The Load Sharing Processor is provided to handle load sharing between the Diesel engine 116 the DC/DC Converter Controller 124 and DC power from Batteries. The Load Sharing Processor monitors power requirements from the Load 122 and efficiently shares the load between the diesel engine generator 116-119 and the DC/DC Converter Controller 124 based on the load requirements and an efficient balance of power generation for the current load requirements based on linear programming in the Load Sharing Processor. The Load Sharing Processor provides substantially efficient use of the diesel engines 116 and the batteries attached to DC/DC Converter Controller 124 for handling base loads and loads requiring torque transients on the tug boat.

In a particular embodiment of the invention, the Load Sharing Processing uses Linear Programming stored as computer program 126 on computer readable medium 128 to read a current operating state for the diesel engines and the batteries attached to DC/DC Converter Controller 124 and determines a substantially optimally efficient operating state for efficiently producing energy to service the load at the current time. The operating state for the diesel generator includes but is not limited to engine revolutions per minute (RPM), variable frequency of a supply voltage, torque, plot point on a speed torque curve for the diesel Generator. The operating state for batteries includes but is not limited to percent charged to capacity, type of battery and plot point on a battery life to power output capacity curve for each battery type used in the system. The Load Sharing Processor achieves a substantially efficient load share by using a linear programming computer program stored on a computer readable medium to efficiently share the load of power generation to provide power a substantially reduced cost. In another embodiment of the invention, a battery is provided as another source to handle loads instantaneous torque requirements. In another embodiment of the invention, the battery is a solar power charged battery storage. In another embodiment of the invention, the batteries are provided to service high torque loads and the diesel engines are eliminated.

In another embodiment of the invention, a combination of diesel engines and batteries are provided to handle loads. In another particular illustrative embodiment of the invention, a computer program is provided in a load management processor, which is in the hybrid power generation plant system. The computer program includes but is not limited to computer instructions stored in a computer readable medium that when executed by the load management processor, perform functions that are useful in accomplishing efficient load sharing between the diesel engines and batteries when servicing loads on a tug boat. In another embodiment, the computer program includes but is not limited to instructions that use linear algebra to manage the load sharing.

In another particular illustrative embodiment of the invention, the computer program performs power management to efficiently provide power. In another particular illustrative embodiment of the invention, the computer program performs energy management. In the energy management embodiment, the computer program performs load balancing by managing energy supplied by multiple diesel engines, variable frequency electric motors, variable voltage electric motors, various energy storage devices and multiple type hybrid batteries. In another particular embodiment of the invention direct current (DC) to DC converter is provided between a bank of different type batteries to provide energy to the oil rig to efficiently handle loads during efficient load sharing between multiple gas engines, variable frequency electric motors, variable voltage electric motors, various energy storage devices and multiple types of hybrid batteries.

In another embodiment of the invention, the load management processor executes the computer program to provide a linear algebra computer program to provide efficient load sharing and energy management to efficiently manage use of the different batteries and energy sources including but not limited to variable speed engines, multiple gas engines, variable frequency electric motors, variable voltage electric motors, various energy storage devices and multiple type hybrid batteries. In another embodiment of the invention, the load management processor executes the computer program to control the diesel engines in reference to an operating state for diesel engines including but not limited to a diesel engine fuel map, the fuel map including but not limited to a speed versus torque curve for the diesel engine to dynamically determine and control an efficient fuel-air mixture provided to the diesel engine generator to control the speed of the diesel engine generator to efficiently service a load. The speed versus torque curve is used by the load management processor to determine a speed to provide a particular torque based on the speed versus torque curve during efficient dynamic load management. In a particular illustrative embodiment of the invention, the diesel engine generator provides more torque at lower speeds.

In a particular illustrative embodiment, a 50 hertz or 60 hertz diesel engine generator is slowed down to increase torque provided by the diesel engine. For example, slowing down the diesel engine to 30 hertz increases the torque provided by the diesel engine at 60 hertz. A slowdown of the diesel engine to 30 hertz is accomplished by an alternating current (AC) to AC converter that is provided to synthesize 60 hertz to 30 hertz. In another embodiment the load management processor executes the computer program provides a nonlinear programming computer program to provide efficient load sharing and energy management. The Load Sharing Processor reads the speed and torque provided by the diesel engine generators, and the batteries connected to the DC/DC convert selects a substantially optimal frequency for each of the based on the speed versus torque curve for the diesel engine generators and the batteries.

In another embodiment, the Load Sharing Processor using a neural network to read the speed and torque provided by the two diesel engine generators and the two batteries connected to the DC/DC convert selects a substantially optimal frequency for each of the based on the speed versus torque curve for the two diesel engine generators and a mix of using the batteries. In another embodiment, the Load Sharing Processor reads the speed and torque provided by the two diesel engine generators and the batteries connected to the DC/DC convert selects a substantially optimal frequency for each of the based on the speed versus torque curve for the two diesel engine generators, and the batteries to provide power to service the load 122.

Turning now to FIG. 1, FIG. 1 is a schematic block diagram a system in one particular illustrative embodiment of a Hybrid Power Generation System 100. As shown in FIG. 1, a Load Sharing Processor 110 which is part of the hybrid power generation system sends control data and receives status data on communication bus 112 to and from a Diesel Engines 114-119, Load 122, and DC/DC Converter Controller 124. The DC/DC converter controller 124 sends control data to and receives status and request data from battery 1 130 and battery 2 132. In an illustrative embodiment battery 1 is a lithium manganese cobalt battery for large transient power requirements, battery 2 is a lithium titanate battery for long life and long duty cycle. In another embodiment and a lead acid battery provides raw power at a low cost.

A Power Bus 120 receives power from Diesel Engine 116, Gas Engine Generator 118 on a Generator Power Bus 140, and DC power from DC/DC Converter Controller 124 from Batteries 1 through N over Battery Power Bus 142.

A computer program 126 including but not limited to computer instructions stored in a Computer Readable Medium 128 are executed by the Load Sharing Processor 110. In a particular illustrative embodiment the Hybrid Diesel Power Generation System 100 Load Sharing Processor 110 controls the Hybrid Power Generation System to dynamically and efficiently provide power to meet load requirements for the Load 122.

In another particular illustrative embodiment, the Load Sharing Processor system generates a power impulse command to for example, provide a torque impulse to an equipment as described in U.S. Pat. No. 9,365,265 by John B. Janik, issued on May 25, 2016 and entitled "Hybrid Winch with Controlled Release and Torque Impulse Generation". In one particular embodiment, a torque profile is selected to apply a sharp rise in power provided by the Hybrid Power Generation System to generate a sharp rise in power as described in U.S. patent application Ser. No. 15/415,626 filed Jan. 25, 2017, by Janik and entitled "System and method for controlling a jack up rig" which is hereby incorporated by reference in its entirety and an anchor handling winch to rapidly increase power applied to the load. The stored battery backup power is applied to achieve a more rapid rise in energy supplied, available power generated, and impulse torque exerted by the equipment than possible using the diesel generator power by itself.

In another embodiment a user input from user input device 125 selecting a torque profile is received by the Load Sharing Processor. In another particular illustrative embodiment, a neural network is provided as a computer program in the computer readable medium that is executed by the Load Sharing Processor to monitor the operating states of the batteries, engines and generator discussed above and energy supplied to the equipment during operations of raising and lowering jack up rig legs and punch through testing and tension and torque applied to the anchor cable and winch during successful anchor setting operations. The neural network monitors the operating states for of all energy sources during the operations and stores them in the computer readable medium. The neural network stores the monitored operating states of the batteries, engines and generators discussed above and provided in the Hybrid Power Generation System which supplies to the equipment during raising and lowering jack up rig legs and punch through testing and tension and torque settings and applies the stored energy settings to the during raising and lowering jack up rig legs and punch through testing and tension and torque applies to the anchor cable and winch during successful anchor setting operations. In another particular illustrative embodiment, an expert system is provided as a computer program in the computer readable medium that is executed by the Load Sharing Processor to monitor energy supplied to the due to changes in loading of the tug boat. The expert system stores the monitored tension and torque settings and applies the stored tension and torque settings to the load during operations.

In a particular illustrative embodiment a system is disclosed including but not limited to a processor in data communication with a non-transitory computer readable medium; a hybrid power source for servicing a system load, the hybrid power source comprising a diesel engine and a battery; a computer program comprising instructions stored in the non-transitory computer readable medium that are executed by the processor, the computer program comprising, instructions determining a current system load serviced by power provided from the hybrid power source; instructions to determine a current operating state for the natural gas engine, the diesel engine and the battery; instructions to use linear programming to determine a new operating state for the natural gas engine, the diesel engine and the battery to reduce power consumption servicing the current system load the diesel engine and the battery; and instructions to replace the current operating state for the diesel engine and the battery to the new operating state for the diesel engine and the battery. In another particular illustrative embodiment of the invention the operating state comprises a load on the diesel engine, speed of the diesel engine and air fuel mixture supplied to the diesel engine, wherein the operating state further comprises torque of the diesel engine. In another particular illustrative embodiment of the invention the operating state comprises a load on the natural gas engine, speed of the natural gas engine and air fuel mixture supplied to the natural gas engine, wherein the operating state further comprises torque of the natural gas engine. In another particular illustrative embodiment of the invention the operating state comprises a load on the battery. In another particular illustrative embodiment of the invention the computer program is a linear program. In another particular illustrative embodiment of the invention the computer program is an expert system. In another particular illustrative embodiment of the invention the computer program is a neural network.

In another particular illustrative embodiment of the invention a method is disclosed including but not limited to determining using a computer program a current system load serviced by power provided from a hybrid power source for servicing a system load, the hybrid power source comprising a diesel engine and a battery; determining a current operating state for the diesel engine and the battery; determining using linear programming to a new operating state for the diesel engine and the battery to reduce for power consumption servicing the current system load the diesel engine and the battery; and replacing the current operating state for the diesel engine and the battery to the new operating state for the diesel engine and the battery. In another particular illustrative embodiment of the invention the operating state comprises a load on the diesel engine, speed of the diesel engine and air fuel mixture supplied to the diesel engine, wherein the operating state further comprises torque of the diesel engine. In another particular illustrative embodiment of the invention the operating state comprises a load on the battery. In another particular illustrative embodiment of the invention the computer program is a linear program. In another particular illustrative embodiment of the invention the computer program is an expert system. In another particular illustrative embodiment of the invention the computer program is a neural network.

In another particular illustrative embodiment of the invention a computer readable medium is disclosed containing instructions that are executed a processor in data communication with a non-transitory computer readable medium to control a hybrid power source for servicing a system load, the hybrid power source comprising a diesel engine and a battery, the computer program comprising instructions stored in the non-transitory computer readable medium that are executed by the processor, the computer program including but not limited to instructions to cause the load processor to determine a current system load serviced by power provided from the hybrid power source; instructions for the processor to determine a current operating state for the diesel engine and the battery; instructions for the processor to use linear programming to determine a new operating state for the diesel engine and the battery to reduce power consumption servicing the current system load the diesel engine and the battery; and instructions for the processor to replace the current operating state for the diesel engine and the battery to the new operating state for the diesel engine and the battery. In another particular illustrative embodiment of the invention in the computer readable medium, the operating state comprises a load on the diesel engine, speed of the diesel engine and air fuel mixture supplied to the diesel engine, wherein the operating state further comprises torque of the diesel engine. In another particular illustrative embodiment of the invention in the computer readable medium, the operating state comprises a load on the battery. In another particular illustrative embodiment of the invention in the computer readable medium, the computer program is a linear program. In another particular illustrative embodiment of the invention in the computer readable medium, the computer program is an expert system.

The present invention can be realized in hardware, software, or a combination of hardware and software. In a specific embodiment, a system according to the present inventions can be realized in a centralized fashion in one computer system, or in a distributed fashion where different elements are spread across several interconnected computer systems. Any kind of computer system or other apparatus adapted for carrying out the methods and inventions described herein may be used for purposes of the present inventions. A typical combination of hardware and software could be a general purpose computer system with a computer program that, when being loaded and executed, controls the computer system such that it carries out the methods and inventions described herein.

The figures herein include block diagram and flowchart illustrations of methods, apparatus(s) and computer program products according to various embodiments of the present inventions. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus may be used to implement the functions specified in the block, blocks, or flow charts. These computer program instructions may also be stored in a computer-readable medium or memory that can direct a computer or other programmable data processing apparatus to function in a particular manner, such that the instructions stored in the computer-readable medium or memory produce an article of manufacture including instructions which may implement the function specified in the block, blocks, or flow charts.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block, blocks, or flow charts.

Those skilled in the art should readily appreciate that programs defining the functions of the present inventions can be delivered to a computer in many forms, including but not limited to: (a) information permanently stored on non-writable storage media (e.g., read only memory devices within a computer such as ROM or CD-ROM disks readable by a computer I/O attachment); (b) information alterably stored on writable storage media (e.g., floppy disks and hard drives); or (c) information conveyed to a computer through communication media for example using wireless, baseband signaling or broadband signaling techniques, including carrier wave signaling techniques, such as over computer or telephone networks via a modem, or via any of networks.

The term "executable" as used herein means that a program file is of the type that may be run by the Load Sharing Processor 110. The term processor covers all processors described herein, including but not limited to processors in the PMS, the MPS, the Load Sharing Processor. The processor can be one processor or separate processors dedicated to functions performed by PMS, MPS and the Load Sharing Processor. The terms Load Sharing Processor, PMS, MPS all refer to a processor that exists in the hybrid diesel power generation system along with a computer program stored in a non-transitory computer readable medium, that can be one processor or separate processors dedicated to functions performed by PMS, MPS and the Load Sharing Processor. In specific embodiments, examples of executable programs may include without limitation: a compiled program that can be translated into machine code in a format that can be loaded into a random access portion of the Computer Readable Medium 128 and run by the Load Sharing Processor 110; source code that may be expressed in proper format such as object code that is capable of being loaded into a random access portion of the Computer Readable Medium 128 and executed by the Load Sharing Processor 110; or source code that may be interpreted by another executable program to generate instructions in a random access portion of the Computer Readable Medium to be executed by the Load Sharing Processor 110.

An executable program may be stored in any portion or component of the Computer Readable Medium including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The Computer Readable Medium may include both volatile and nonvolatile memory and data storage components. Volatile components are those that do not retain data values upon loss of power. Nonvolatile components are those that retain data upon a loss of power. Thus, the Computer Readable Medium may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In a specific embodiment, the Load Sharing Processor may represent multiple Load Sharing Processors and/or multiple processor cores and the Computer Readable Medium may represent multiple Computer Readable Mediums that operate in parallel processing circuits, respectively. In such a case, the local interface may be an appropriate network that facilitates communication between any two of the multiple Processors, between any processor and any of the Computer Readable Medium, or between any two of the Computer Readable Mediums, etc. The local interface may comprise additional systems designed to coordinate this communication, including, for example, performing load balancing. The Load Sharing Processor may be of electrical or of some other available construction.

Although the programs and other various systems, components and functionalities described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

Flowcharts and Block Diagrams of FIG. 1 show the functionality and operation of various specific embodiments of certain aspects of the present inventions. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a Load Sharing Processor in a computer system or other system. The machine code may be converted from the source code, etc. If embodied in hardware, each block may represent a circuit or a number of interconnected circuits to implement the specified logical function(s).

Figure 3:
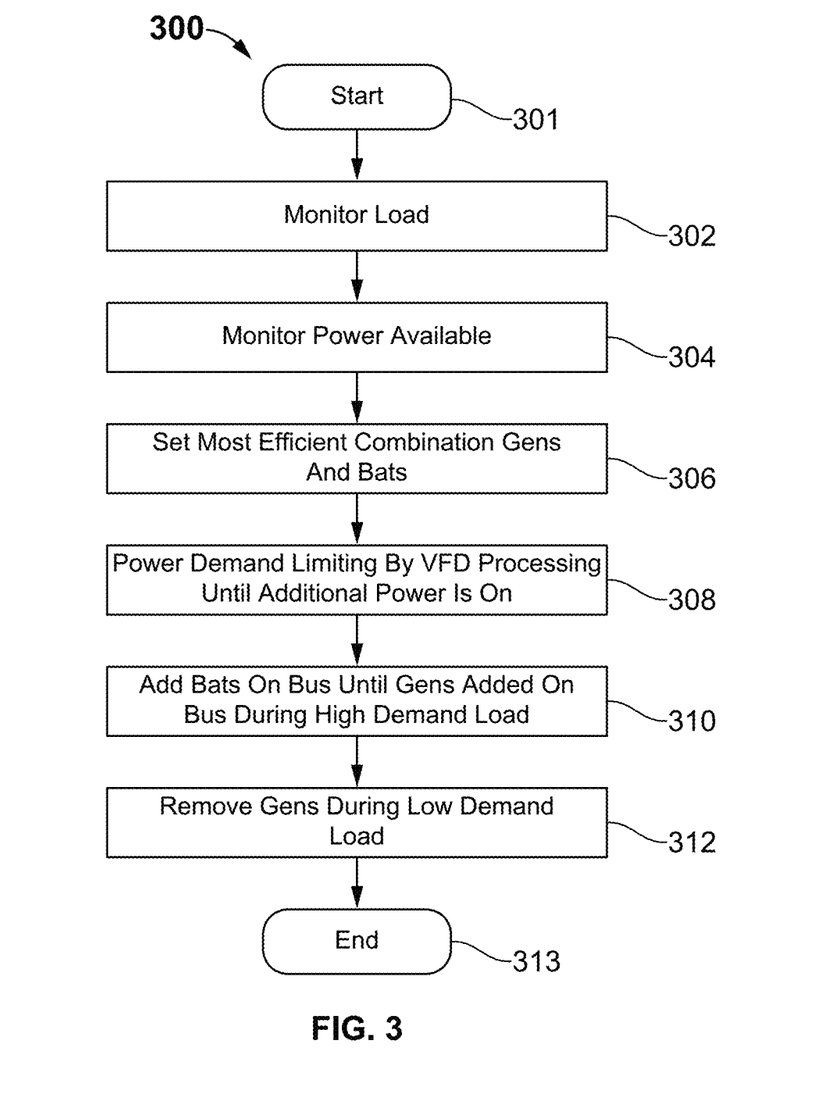
FIG. 3 is a flow chart of functions performed by the hybrid diesel power generation system installed on a tug boat.

Although the flowchart and block diagram of FIG. 3 show a specific order of execution, it is understood that the order of execution may differ from that which is depicted. For example, the order of execution of two or more blocks may be scrambled relative to the order shown. Also, two or more blocks shown in succession in FIG. 1 may be executed concurrently or with partial concurrence. Further, in some embodiments, one or more of the blocks shown in FIG. 1 may be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present inventions.

Any logic or application described herein that comprises software or code can be embodied in any non-transitory computer-readable medium, such as computer-readable medium, for use by or in connection with an instruction execution system such as, for example, a Load Sharing Processor in a computer system or other system. In this sense, the logic may comprise, for example, statements including instructions and declarations that can be fetched from the computer-readable medium and executed by the instruction execution system. In the context of the present inventions, a "computer-readable medium" may include any medium that may contain, store, or maintain the logic or application described herein for use by or in connection with the instruction execution system.

The computer-readable medium may comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The Load Sharing Processor may further include a network interface coupled to the bus and in communication with the network. The network interface may be configured to allow data to be exchanged between computer and other devices attached to the network or any other network or between nodes of any computer system or the video system. In addition to the above description of the network, it may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface 159 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The Load Sharing Processor may also include an input/output interface coupled to the bus and also coupled to one or more input/output devices, such as a display, a touchscreen, a mouse, or other cursor control device, and/or a keyboard. In certain specific embodiments, further examples of input/output devices may include one or more display terminals, keypads, touchpads, scanning devices, voice or optical recognition devices, or any other devices suitable for entering or accessing data by one or more computers. Multiple input/output devices may be present with respect to a computer or may be distributed on various nodes of computer system, the system and/or any of the viewing or other devices shown in FIG. 1. In some embodiments, similar input/output devices may be separate from the Load Sharing Processor and may interact with the Load Sharing Processor or one or more nodes of computer system through a wired or wireless connection, such as through the network interface.

Figure 2:
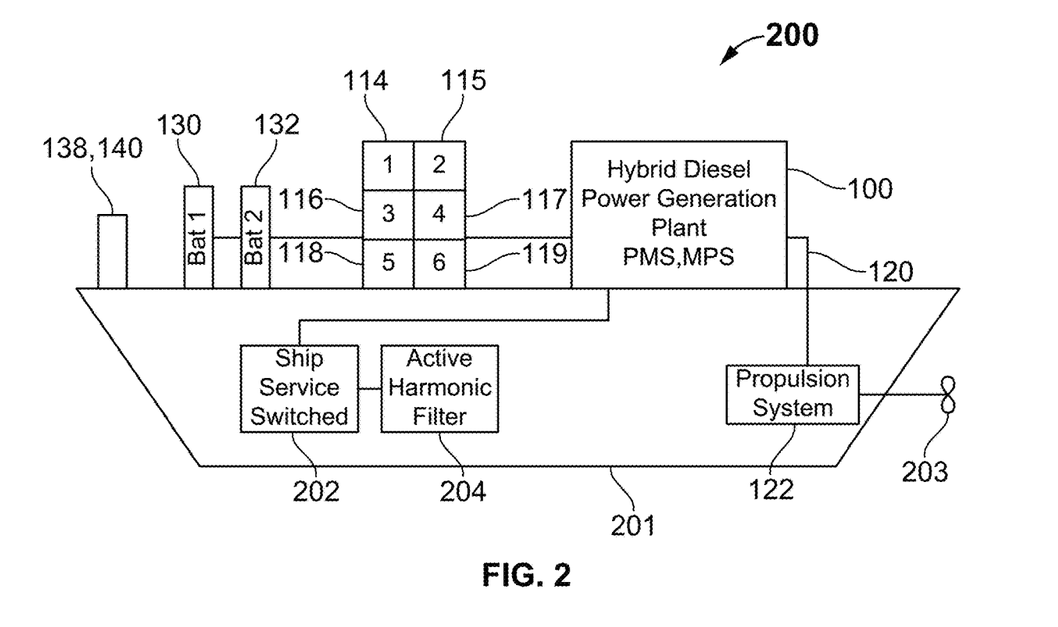
FIG. 2 depicts schematic representations of a particular illustrative embodiment of the invention as a hybrid diesel power generation system installed on a tug boat.

Turning now to FIG. 2, FIG. 2 depicts schematic representations of a particular illustrative embodiment of the invention as a hybrid diesel power generation system installed on a tug boat. As shown in FIG. 2, batteries 130, 132, 138 and charger 140 along with generators 114-119, are connected to the hybrid diesel power generation system. The bus 120 runs to propulsion system 122 that turns propeller 203. A ship service switch board 202 with active harmonic filters 204 is provided on the tug boat as described herein.

Turning now to FIG. 3, FIG. 3 is a flow chart of functions performed by the hybrid diesel power generation system installed on a tug boat by a processor computer program. The computer program starts at 301 and monitors a current load at 302. The processor monitors the power available at 304. The processor connects a most efficient combination of batteries and diesel generators to the bus for the current load. At 308 the processor performs power demand limiting by VFD processing, described herein, until the additional diesel generator power is on the bus. At 310 the processor connects additional batteries are connected to the bus during high demand loads. At 312 the processor removes diesel generator power from the bus when the load demand is low.

It is to be understood that the inventions disclosed herein are not limited to the exact details of construction, operation, exact materials, or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

In an illustrative embodiment of the invention, a hybrid diesel electric tug boat is provided with a hybrid power generation plant rated at 4,165 kW. In the hybrid power generation power plant, power is generated by 6 diesel generators each rated at 600 kW at 0.8 PF at 690 VAC. In addition, the hybrid power generation plant provides the hybrid diesel electric tug boat with 565 kWh of stored energy from two on board lithium ion batteries. The stored energy in the lithium ion batteries enables the hybrid diesel electric tug boat to operate with a lower number of diesel generators running, for example, 2 of 6 diesel generators when operating under a reduced load. The lithium ion batteries also act as a backup power supply when there is a sudden demand for power in the hybrid diesel electric tug boat. (See U.S. Pat. Nos. 9,802,679B2[1] and 9,923,370B2[2]). During a sudden demand, the lithium ion batteries provide additional power to the hybrid diesel electric tug boat until the remaining 4 of the 6 generators are started up and connected to the main propulsion switchboard. The main propulsion switchboard is controlled using computer programs described herein, which in part use systems and methods for mechanical load balancing using generator droop frequency based on motor load feedback, better described in the Electronic Power Design U.S. Pat. Nos.

10,337,424 and 10,541,536 B2. In one embodiment of the invention, the main propulsion for the tug boat is provided by two 1,865 kW, Azimuthing Z-Drive propulsion units, which will each be powered by variable frequency drives.

Ship service power is derived from the main propulsion switchboard through 690:120/208 VAC ship service transformers. The ship service switchboard also active harmonic filters that will provide clean power for sensitive electronics onboard the vessel such as radars, other navigation devices, third party equipment, hotel load etc. These Active Harmonic Filters shall be of the type described in the Electronic Power Design U.S. Pat. No. 9,401,605 B2.

Specification of each major component of the hybrid power generation plant are disclosed herein.

In a particular illustrative embodiment of the invention, the hybrid power generation plant includes but is not limited to a marine main propulsion generator control and distribution switchboard, referred to herein as a main propulsion switchboard or "MPS" for the control and protection of six (6) 600 kW, 690 Volt AC, 3-phase, 3-wire, 0.8 PF, 750 kVA diesel engine generator sets with automatic parallel operation. The MPS also has two (2) 690 Volt AC, 2500 Amp AC, 3 phase, 60 Hz tin-plated copper main buses rated for 65 kAIC (Bus "A" & Bus "B") separated by a tie breaker. The engine generators can be powered by other hydrocarbon fuels, such as gasoline or natural gas. The MPS provides parallel capable operation and control of the six diesel generators. The MPS has two incomer breakers—one per bus that tie the main bus to battery inverters attached to the two batteries. The MPS, located in an Engine Room, is skid mounted. The MPS is designed and provided as described in this Specification. The switchboard is constructed by a UL-891 certified facility.

The propulsion system vendor/integrator wiring diagrams and shop drawings of the switchboard are provided prior to fabrication. The wiring diagrams and shop drawings shall clearly show design, construction material, finish installation, front layout, point to point wiring diagrams, material list, mounting details, and label plate list including floaters for terminal blocks. The manufacturer provides three complete sets and one wiring diagrams and shop drawings of as-built drawings of the switchboard and cut sheets of the components to the contractor for delivery to the Client. Switchboard components listed in this specification and all others required for a complete system are provided.

Factory tests are performed to show the full functionality of the hybrid power generation plant which includes but is not limited to a power management system (PMS) and a main propulsion switchboard (MPS) automation to control all generators and the distribution of power in an automatic mode. Rubber matting with dielectric resistance are provided in front of all switchboards. A propulsion vendor/integrator performs Short Circuit and Device Evaluation Studies, a Protective Device Coordination Study, and a Harmonic Study. The studies include all major AC electrical power distribution systems aboard the vessel.

An MPS enclosure is provided as a drip proof enclosure having a dead front, all steel construction. All operating controls and indicators are front mounted and are fully accessible by hinged panels. All other components are accessible by removable front, side, and rear panels. Construction allows for cables entering the bottom of the MPS. The MPS base is appropriately sized openings for possible cable entrance. All front instrument panels are formed approximately 1 in on all sides and hinged. Front panels covering molded case distribution circuit breakers are formed, hinged, and bolted. Side and rear panels are flat sheets, bolted on. All formed and bolted panels are fastened with center seeking, knurled head, captive screws, and floating nut block assemblies. All formed and hinged front panels are fastened with open and turn flush clamps. All hinged panels are equipped with door positioners for holding the panel in an open position during access to internally mounted components. Non-conducting grab rails are provided across the entire front of the switchboard.

Bus bars are provided and are made of commercially pure copper. All bus bars are tin, or silver plated over their entire length. Bolts, washers, and nuts used to maintain bus contact shall be of corrosion resistant material or appropriately plated. All bolts in bus connections shall be torque wrench tightened to an appropriate uniform value for each bolt and marked across all joints with permanent marker or paint pen. The mechanical strength, bracing and supports of the bus is designed for a symmetrical RMS short circuit current of 65 kA.

All electrical components are selected to operate satisfactorily in a 45° C. ambient temperature and shall be as described below.

Circuit breakers are quick-make, quick-break, trip free, with tripping mechanisms capable of safely opening the circuit they protect while subjected to the maximum fault current. All poles are opened simultaneously by a common trip mechanism. Trip elements or sensors are calibrated or ambient compensated for operation in a 45° C. ambient temperature, or properly de-rated in accordance with the circuit breaker manufacturer's instructions for use in ambient temperatures above 40° C. Breaker frame size, nominal trip setting, and de-rated trip setting shall be shown on the main propulsion switchboard design drawings, as-built electrical one-line diagram, and on the engraved breaker ID plate attached to the front of the switchboard. All circuit breakers are mounted in such a manner that the breakers may be removed from the front without disconnecting line or load bus or power cable terminations.

The circuit breakers are removable draw-out air circuit breaker or power circuit breaker, with motorized spring charged operators and adjustable electronic trip logic units, rated 65 kAIC minimum. The circuit breakers accept remote open and close signals from the PMS or switchboard mounted manual actuation switches, and are equipped with auxiliary contacts, under voltage trips, and shunt trips to provide a functional and operable system. Each shall be provided with means to lock in the open position. All rotary type instrument, control, and circuit breaker switches are oil-tight and clearly labeled for function. All under-voltage trip (UV) devices are 24 VDC from a battery source, to prevent tripping during power transfer operations.

Instruments are constructed to minimize damage from dust or moisture. Instrument fuses are of the non-renewable cartridge type. The instrument fuses are accessible from the front of the switchboard through the hinged panels containing the instruments and controls they protect. Instrument and control wire are a minimum of 14 AWG, type SIS, except for electronic component connections, which are 18 AWG, flame retarding, flexible switchboard wire, or equal. Each wire end shall be fitted with a permanent sleeve type wire number and terminated with vinyl insulated compression lugs, applied with a closed cycle tool, where component terminations permit. Wires terminating in DIN Rail type screw compression terminal blocks have compression end sleeves over the conductor for protection and strength. Spring cage or push in wire capture type terminals is preferred over screw down type connections if available. Switchboard wiring is run neatly and properly supported.

Grommets are provided to protect wiring where it passes through metal panels. Components required to be interconnected with external equipment wired to barrier type terminal boards that are readily accessible and clearly marked. The secondary of all current transformers are wired to shorting type terminal blocks. Wiring duct, cable tie mounting devices, clamps or clips are permanently fastened. Any adhesives used are epoxy type. Foam or double sided tape is specifically prohibited.

Control components for each generator control compartment (6 each):
- Qty. 1 Siemens or Schneider power circuit breaker, 630 AF, draw out, electrically operated, with Shunt Trip (ST) or Undervoltage Trip (UVT), 4a and 4b auxiliary contacts, long time, short time, and instantaneous trip, and bell alarm
- Qty. 1 Set of potential transformers with primary and secondary fuses, as required
- Qty. 3 Current transformers, as required
- Qty. 1 Control power transformer
- Qty. 1 Generator "heater on" indicator light
- Qty. 1 Generator heater switch
- Qty. 1 Generator heater relay
- Qty. 1 Circuit breaker control switch, three position (open, close, and neutral)
- Qty. 1 Circuit breaker Closed indicator light
- Qty. 1 Circuit breaker Open indicator light
- Qty. 1 Fault/tripped indicator light
- Qty. 1 Automatic voltage regulator, mounted and wired
- Qty. 2 Manual voltage control, mounted and wired
- Qty. 1 Woodward EasyGen 3500 series digital generator protection and load sharing relay
- Qty. 1 Basler DECS-100 voltage regulator, mounted and wired
- Qty. 1 Voltage control switch, raise-off-lower, spring return to off, or a voltage adjusting potentiometer depending on the type of voltage regulator
- Qty. 1 Digital governor control module, Woodward 2301E, mounted and wired, if required for mechanical engines
- Qty. 1 Speed control switch or potentiometer depending on the governor interface provisions
- Qty. 1 Emergency Stop push/pull button
- Qty. 1 Power Available Light
- Qty. 1 Generator Auto Start Ready Light Control components for each Battery Inverter connection cabinet (2 each):
- Qty. 1 Siemens or Schneider Generator power circuit breaker, 2500 AF, draw out, electrically operated, with Shunt Trip (ST) or Undervoltage Trip (UVT), 4a and 4b auxiliary contacts, long time, short time, and instantaneous trip, and bell alarm
- Qty. 1 Set of potential transformers with primary and secondary fuses, as required
- Qty. 3 Current transformers, as required
- Qty. 1 Control power transformer
- Qty. 1 Circuit breaker Closed indicator light
- Qty. 1 Circuit breaker Open indicator light
- Qty. 1 Tripped indicator light
- Qty. 1 Metering device
- Qty. 1 Power Available Light
- Qty. 1 Battery Auto Ready Light
- Qty. 1 Battery Alarm Light
- Qty. 1 Battery Fault Light Components for Bus Tie and Grounding Sections (1 each):
- Qty. 1 Siemens or Schneider Bus tie circuit breaker, 2500 AF, draw out, electrically operated, with ST or UVT, 4a and 4b auxiliary contacts, long time, short time and instantaneous trip and a bell alarm
- Qty. 1 Circuit breaker control switch, three position (open, close, and neutral)
- Qty. 1 Set of circuit breaker status indication lights
- Qty. 1 Set of digital bus ground detection per bus ("A" and "B")
- Qty. 2 Sets of bus CT's
- Qty. 2 Sets of bus potential transformers ("A" and "B")
- Qty. 1 Woodward LS-6 load sharing unit with display
- Qty. 1 Set of bus voltage surge suppression systems per bus Components for Port Distribution Section (1 each):
- Qty. 1 2500 AF Siemens or Schneider port propulsion motor drive feeder circuit breaker, manually operated, draw out with ST or UVT, 2a and 2b auxiliary contacts, and thermal magnetic trip.
- Qty. 1 250 AF Siemens or Schneider Ship service transformer T-1 feeder circuit breaker, manually operated, plug-in with ST or UVT, 4a and 4b auxiliary contacts, and thermal magnetic trip.
- Qty. 2 250 AF Siemens or Schneider Spare Breaker Components for Starboard Distribution Section (1 each):
- Qty. 1 2500 AF Siemens or Schneider starboard propulsion motor drive feeder circuit breaker, manually operated, draw out with ST or UVT, 4a and 4b auxiliary contacts, and thermal magnetic trip.
- Qty. 1 250 AF Siemens or Schneider Ship service transformer T-2 feeder circuit breaker, manually operated, plug-in with ST or UVT, 2a and 2b auxiliary contacts, and thermal magnetic trip.
- Qty. 2 250 AF Siemens or Schneider Spare Breakers Power Management System (PMS):
- Qty. 1 Programmable Logic Controller, (PLC), Siemens S7 PLC based
- Qty. 1 7" Siemens HMI touchscreen
- Qty. 1 PLC Fail Light
- Qty. 1 Local Mode Select Switch, Manual-Auto The PMS as part of the hybrid power generation plant contains one or more processors that controls the six propulsion generators and have breakers to connect the battery inverters to the main buss. The switchboard is arranged for automatic and manual parallel operation of propulsion generators in any combination. A processor in the Power Management System (PMS), in automatic mode, monitors and controls the power available to the propulsion main motors, decide on the most efficient combination of battery/generators automatically for the current load based on power demand.

Generators start priority switches and controls are provided for each generator to determine a start order of generators when the PMS is in control. A remote indication in the Pilot House show the current status of each power source as "connected," "standby," or "manual."

Load Monitoring and Limiting

The switchboard MPS provides a processor and a computer program including computer instructions stored in a non-transitory computer readable medium, wherein the processor executes the computer program and performs automatic load monitoring and provides operator warnings via switchboard indicators and bridge indicators whenever an state of the state propulsion generators reach 85% (adjustable) full combined output. As part of the MPS computer program, overload/blackout of the propulsion generators are avoided through automatic propulsion main motor power demand limiting by the VFDs, until additional power has been brought onto the MPS automatically by the PMS, or load has been reduced.

The batteries storage of power in the hybrid power generation plant is primarily intended to act similar to the "spinning reserve" capacity that is be provided by generators that are connected to the bus. In one operating scenario, the hybrid tug boat operates with only two of six supplied generators running and are connected to the bus along with the battery inverters. If a situation arises where the hybrid power generation plant provides full power to the propulsion motors, the battery bank and the inverters provide the remaining power needed to provide full power to tug boat propulsion thrusters for a period of 90 seconds during which the PMS starts some or all of the remaining generators and connects them to the main bus.

The battery and inverter system are also used in peak sharing mode while in operation to reduce the run time on the diesel generators. The battery and inverter system is also used when the hybrid tug boat is docked at ports to reduce emission and fuel consumption.

Specification for Battery Banks (2 each):
283 kWh storage capacity with a 4 C discharge rate for a period of 90 seconds
Battery voltage ranging from 640 VDC to 1100 VDC with 880 VDC nominal voltage
Battery Management System (BMS) that dictates charge/discharge rates and acts as a monitoring and protection device for the battery.
CAN, Profibus, Modbus or similar standard for communication between the BMS and the vessels power management system.
Ventilation for hot gases in case of thermal run away of any of the battery cells.

Battery Inverter Specifications

The battery inverters for this vessel are split into one port side battery inverter and one starboard side battery inverter. The battery inverters are liquid cooled.

Specification for Battery Inverters (2 each):
1900 kW AC power at 690 VAC
DC voltage rating range of 640 VDC-1100 VDC
VACON NX, Avid Extreme AFE Drive technology, or equal
LCL filters/Isolation transformers
The inverter package should be able to charge and discharge the battery bank and mode of operation and power level shall be dictated by the vessel's power management system
PROFIBUS or PROFINET communication to the PMS.

Two separate and enclosed rooms are provided to house the port and starboard battery banks and inverters. These enclosed rooms are at least 108 inches wide, 96 inches deep and 80 inches tall. The room is insulated. Air conditioning is provided to keep the enclosed rooms cooler than the adjacent engine room temperature. The air conditioning is not intended to remove the heat loss from battery banks and inverters, but to prevent condensation on the liquid cooled equipment. The battery and inverter vendor provide ambient heat loss data to properly size this air conditioner.

Propulsion Variable Frequency Drives

The propulsion main motors are controlled a processor as part of the hybrid power generation plant through variable frequency drives (VFDs).

Each VFD is a 6-pulse two (2) quadrant, reversing, non-regenerative, variable torque, AC variable frequency drive. The drive is rated for 690 volts AC, 3-phase, 60 Hz input and 1875 kW minimum, 2000 amps AC continuous and at 110% for 1 minute.

The VFD is liquid cooled and has the following features:
Qty. 1 VACON NX, Avid Extreme AC Drive technology, or equal
Qty. 1 3-phase AC line reactor
Qty. 1 6-Pulse Diode Front End (DFE) converter/rectifier
Qty. 1 Inverter section
Qty. 1 450 kW Brake Chopper circuit for regenerative current
Qty. 1 Dynamic braking resistor, stainless steel enclosed, 50% duty cycle forced ventilation, remotely mounted by others Each VFD shall be complete with the following:
Qty. 1 Set of IP-22 enclosures.
Qty. 1 Operator Keypad, door mounted
Qty. 1 PROFIBUS or PROFINET communication card
Qty. 1 Emergency stop pull-button VFD Propulsion Control shall consist of the following:
As part of the processor in the hybrid power generation plant run marine specific propulsion control software, as part of the hybrid power generation plant wherein the control software is provided as a computer program stored in a non-transitory computer readable medium, including but not limited to the following features:
Redundant PROFIBUS or PROFINET communication
Fast acting characteristics to adapt propeller load to diesel engine capability to prevent possible black outs
Characteristics to reduce propeller speed during emergence out of water, and to smooth load increases when returning into water
Speed mode control for maneuvering for immediate response
Step-less switching from speed control to power control mode depending on vessel speed to simplify operation and ensure best power station efficiency
No limitation in power draw from gensets depending on sea and operational conditions, i.e. each genset can be loaded 100% and ensures al efficient utilization of the power station
Handling of conventional propellers with two-rotational directions
Standardized interface to propeller control Dynamic Load Limitation (DLL)

As part of the hybrid power generation plant computer program, a processor in the hybrid power generation plant executes a computer program that provides DLL control that limits the power of the heavy load drive according to actual generator capacity. This means the drive is not seen as a heavy consumer and can start the main motors with only two generators running. As part of the hybrid power generation plant the internal control system in the VFD limits its power consumption to the actual generator maximum load capability. The PMS starts an additional generator and then the hybrid power generation plant computer program in the VFD control increases power up to the new limit, and so on. In case of a trip of one of the generators, the remaining generator(s) can be overloaded. The DLL system detects this and limits the power consumption of the propulsion system. The part of the hybrid power generation plant computer program in the VFD responds sufficiently fast so that a "Black-Out" of the remaining generators is avoided.

The DLL system is part of the VFD and works independently of but as part of the PMS, all of which being a part of the hybrid diesel power generation system processor. No additional external control signals are needed other than the signals of the generator power and, if necessary, the status of the bus-tie breakers.

A ship service (SS) switchboard as part of the hybrid power generation plant computer program provides for control and distribution of 3-phase, 208/120 VAC electrical power for the vessels non-propulsion equipment. The 208/120 VAC power is derived from the main switchboard (port and starboard) through two ship service transformers, each rated at 162.5 kVA or from a shore power supply. The switchboard provides for non-parallel operation of either ship service transformer or the shore power feed. The ship service switchboard includes but is not limited to a phase monitoring system that indicates a phase rotation of the shore power connection and prevents a shore power breaker from being closed if the shore power phase rotation is incorrect.

Active harmonic filters are installed either inside the ship service switchboard or remotely mounted and connected to the switchboard. The active harmonic filter is sized to maintain a harmonic content on the ship service switchboard under ABS approved limits when both propulsion motors are operating at rated power. The active harmonic filter employs EPD patented sensing technology for optimal sizing.

The ship service switchboard, located on the equipment skid, is mounted and sway braced to the surrounding structure. The switchboard is constructed by a UL-891 certified facility. Verification of certification shall be provided to the Client. The switchboard is installed in accordance with U.S. Coast Guard 46 CFR 111.30-1.

The switchboard manufacturer provides wiring diagrams and shop drawings of the switchboard to the Client prior to fabrication. The drawings shall clearly show design, construction material, finished installation, front layout, point to point wiring diagrams, material list, mounting details, and label plate list including floaters for terminal blocks. The manufacturer shall provide to the Client three complete sets, as well as electronic sets in .PDF format, of as-built drawings of the switchboard and cut sheets of the components. Switchboard components listed in this specification and all others required for a complete system shall be provided. The switchboard is demonstrated during tests at the manufacturer's facility, or Contractor's facility to fully provide operating logic that accomplishes the functionality and operation specified in the below paragraphs.

The switch service switchboard is drip proof enclosed, having a dead front, and all steel construction. All operating controls and indicators shall be front mounted and fully accessible by hinged panels. All other components shall be accessible by removable front, side, and rear panels. Construction allows for cables entering the top or bottom of the switchboard. The switchboard frame shall be constructed of cold rolled formed steel and/or structural steel angles bolted together into a rigid framework. The bottom shall be completely open for possible cable entrance. All front instrument panels are formed approximately 1 in on all sides and hinged. Front panels covering molded case distribution circuit breakers shall be formed and bolted. Side and rear panels are flat sheets and bolted on. All formed and bolted panels shall be fastened with center seeking, knurled head, captive screws, and floating nut block assemblies. All formed and hinged front panels are fastened with open and turn flush clamps. All hinged panels shall be equipped with door positioners for holding the panel in the open position during access to internally mounted components. Non-conducting grab rails are provided across the entire front of the switchboard.

Bus bars are provided and are made of commercially pure copper and sized in accordance with the table in the 2002 revision of IEEE-45. All bus bars are made of tin or silver plated over their entire length. Bolts, washers, and nuts used to maintain bus contact are made of corrosion material or appropriately plated. All bolts in bus connections are torque wrench tightened to an appropriate uniform value for each size bolt. After final tightening, each bus bolt, nut, and washer is marked with a line going across them to an adjacent area of the bus with a permanent marker or paint pen. The mechanical strength, bracing and supports of the bus shall be designed for a symmetrical RMS short circuit current of 25 kA.

All electrical components are selected to operate satisfactorily in a 45° C. ambient temperature and shall be as described below. Circuit breakers are quick-make, quick-break, trip free, with tripping mechanisms capable of safely opening the circuit they protect while subjected to the maximum fault current of 25 kA. All poles shall be opened simultaneously by a common trip mechanism. Trip elements or sensors in the Engine Room shall be calibrated or ambient compensated for operation in a 45° C. ambient temperature, or properly de-rated in accordance with the circuit breaker manufacturer's instructions for use in ambient temperatures above 40° C. Breaker frame size, nominal trip setting, and de-rated trip setting shall be shown on the switchboard design drawings, as-built electrical one-line diagram, and on the engraved breaker ID plate attached to the front of the switchboard. The ship service transformer feed and shore power feed circuit breakers shall be mounted in such a manner that the breakers may be removed from the front without disconnecting line or load bus or power cable terminations through use of draw-out breakers or heavy duty plug-in bases for molded case circuit breakers. Instruments Switchboard Components:

The following description of switchboard components provided within various compartments is for guidance only and does not dictate the final design and arrangement. It is the manufacturer's responsibility to furnish all components required for a complete and workable system. Switchboard manufacturer shall provide sufficiently detailed descriptive information about the switchboard including all drawings, parts lists, operating description, and other documentation to obtain regulatory and owner approvals.

Control components for each transformer monitoring compartment:
- Qty. 1 Set of potential transformers with primary and secondary fuses, as required
- Qty. 3 Current transformers, as required
- Qty. 1 Control power transformer
- Qty. 1 Transformer feed multifunction meter, SATEC PM130EH Plus Power Meter
- Qty. 1 Circuit breaker control switch, three position (open, close, and neutral)
- Qty. 1 Circuit Breaker Closed indicator light
- Qty. 1 Phase Sequence/Balance Monitor (PSBM), shore power feed only
- Qty. 1 Power Available Light
- Qty. 1 Ground Detection Panel This switchboard shall control two (2) ship service transformers and one (1) shore power feed. The switchboard shall be interlocked so that only one transformer or the shore power source may feed the switchboard at any time. It is electrically interlocked to provide OPEN TRANSITION transfers only between shore power supply and ship service transformer supply, and from one ship service transformer to the other.

Two ship service transformers each rated at 162.5 kVA, 690 VAC to 120/208 VAC 3 phase 60 Hz shall be provided. The transformers are mounted in the engine/propulsion room and should be able to operate at rated current at 45 C ambient temperature.

The active harmonic is used to maintain the harmonic content on the ship service switchboard under ABS approved limits.

The Active Harmonic Filter has the following features:
  Qty. 1 Comsys, AccuSine or other equivalent manufacturer active harmonic filter with sensor-less technology sized for a 162.5 kVA transformer.
  Qty. 1 Normally closed fail safe warning system that triggers if the filter fails or if the harmonic content on the switchboard rises above allowed limits.

A 13 in to 15 in HMI digital display with built-in dimmer control shall be mounted in the Pilot House side console to display all propulsion related information, as well as all monitoring alarm and control system information from the rest of the vessel. The display is a touch screen type, with paged displays, and virtual control buttons or switches for remote control of specified functions.

Systems are displayed in clear and simple Client approved MIMIC bus arrangements. MIMIC bus is a one-line diagram on the face of the Switchboard showing the principal connections and electrical components of the system.

Monitored points, devices and systems shall have the data collected in local 1/0 panels located below the main deck. The collected data shall be distributed to the Pilot House HMI display through a communication link. A slave alarm display is located in the Engine Room, and shall only have display functions, with no control functions other than alarm acknowledgement and silence.

Independent propulsion VFD emergency shutdown switches shall be provided at the side console. Other controls and displays shall be provided as required by rules and regulations. All meters, displays and panels shall be drop in type, for installation in shipyard provided consoles.

The hybrid power generation plant provides a trailer segregated into two rooms. The room partition at the rear of the trailer called the "transformer room" and contains the large four-winding transformer positioned over the axles. The forward room called the "switchgear room" contains the medium voltage switchgear and other controls.

The transformer room will be well ventilated using filtered louvers in the side walls. The minimum square inches of louver area will be specified by EPD. The requirement for louver space is expected to be no less than 5700 square inches. The louvered openings shall be provided with solid hinged metal doors to cover the openings for transit. The doors must include provisions to latch open while in operation and latch closed while in transit. The approximate dimensions of the transformer are 105"L×70"W×105"H. The approximate weight is 24,000 lbs. The floor level of the transformer room will be recessed as low as possible in order to provide a minimum of 110" internal floor to internal ceiling height. The transformer will require a 120V power circuit installed by the trailer manufacturer from the 240/120V Square-D panel board in the switchgear room. A communication cable is installed from the transformer to the PLC control panel in the switchgear room.

The rear of the trailer has a cargo doors with a minimum height of 107". EPD intends to install micro switches inside the cargo doors to signal the open/closed status of the doors. The control wiring for the micro switches from the rear doors to the PLC control cabinet in the switchboard room will be installed by the trailer manufacturer. The doors require provisions for mechanical locks.

In addition to the main transformer, the room will contain three (3) smaller neutral forming transformers. The approximate dimensions and weight for each are 22"×20"×15" at 250 lbs. Three (3) grounding resistors will be in this room as well, each with approximate dimensions of 29"×21"×16". EPD will design a structure or sheet metal enclosure to stack these items.

The hybrid power generation plant further provides a switchgear room which is climate controlled with a 3 ton wall mounted Bard A/C unit. The exterior and interior walls of this room shall be well insulated. The partition wall separating the transformer room from the switchgear room will not contain a door but shall be internally framed for a future door. This wall shall have an observation window, approximately 6"×18" or nearest standard size, in order to view into the transformer room while standing in the switchgear room.

The medium voltage switchgear lineup inside this room will be approximately 89"L×48"O×89"H. The weight will be approximately 3000 lbs. In addition to the medium voltage lineup, this room will contain the 24V power distribution, 240/120V panel, transfer switch, and a PLC control panel. The approximate weight of the additional panels is 1500 lbs.

A 240/120V, 30 circuit Square-D panel board is provided by the trailer manufacturer. EPD will prepare a circuit diagram for this system in collaboration with the trailer manufacturer. The 240/120V system will feed into a battery backed up 24V DC system provided by EPD. The battery backed 24V DC power will be distributed to the switchgear controls and to select lighting circuits. The remaining lighting circuits will be powered by non-battery backed up power. The lights and lighting wiring is to be provided and installed by the trailer manufacturer.

In a particular illustrative embodiment of the invention a hybrid power generation plant system for a tug boat is disclose, the system comprising a plurality of diesel engines; an electrical bus switchably attached to the plurality of diesel engines, a batteries switchably attached to the electrical bus; a load comprising a tug boat propulsion load attached to the electrical bus; a hybrid power source for servicing a system load, the hybrid power source comprising a diesel engine and a battery; a processor the executes a computer program of instructions stored in a non-transitory computer readable medium; a computer program comprising instructions stored in the non-transitory computer readable medium that are executed by the processor, the computer program comprising, instructions determining a current system load serviced by power provided from the hybrid power source; instructions to determine a current operating state for the diesel engine and the battery; instructions to determine a new operating state for the diesel engine and the battery to reduce power consumption servicing the current system load the diesel engine and the battery; and instructions to replace the current operating state for the diesel engine and the battery to the new operating state for the diesel engine and the battery.

In another illustrative embodiment of the invention, the operating state comprises a load on the battery, a load on the diesel engine, speed of the diesel engine and air fuel mixture supplied to the diesel engine and torque of the diesel engine. In another illustrative embodiment of the invention the computer program further comprises instructions to determine when the load requires additional power; instructions to connect the batteries to the bus for a period of 90 seconds when the load requires additional power; and instructions to connect additional generators to the bus during the 90 seconds.

In another illustrative embodiment of the invention the computer program further comprises instructions to limit power demand until the additional generators are connected to the bus. In another illustrative embodiment of the invention the computer program further comprises instructions to add batteries to the bus during high power demand from the load. In another illustrative embodiment of the invention the computer program further comprises instructions to remover generators from the bus during low power demand from the load. In another illustrative embodiment of the invention the computer program is a neural network.

In another illustrative embodiment of the invention, a method is disclosed comprising determining using a computer program a current system load serviced by power provided from a hybrid power source for servicing a system load, the hybrid power source comprising a diesel engine and a battery; determining a current operating state for the diesel engine and the battery; determining a new operating state for the diesel engine and the battery to reduce for power consumption servicing the current system load the diesel engine and the battery; and replacing the current operating state for the diesel engine and the battery to the new operating state for the natural gas engine, the diesel engine and the battery.

In another illustrative embodiment of the invention, a method is disclosed wherein the operating state comprises a load on the diesel engine, speed of the diesel engine and air fuel mixture supplied to the diesel engine, wherein the operating state further comprises torque of the diesel engine. In another illustrative embodiment of the invention, the method further comprises determining when the load requires additional power; connecting the batteries to the bus for a period of 90 seconds when the load requires additional power; and connecting additional generators to the bus during the 90 seconds.

In another illustrative embodiment of the invention, the method further comprises limiting power demand until the additional generators are connected to the bus. In another illustrative embodiment of the invention, the method further comprises removing generators from the bus during low power demand from the load. In another illustrative embodiment of the invention, the computer program is a neural network. In another illustrative embodiment of the invention, a hybrid diesel power generation system is disclosed comprising a computer readable medium contain instructions that are executed a processor in data communication with a non-transitory computer readable medium to control a hybrid power source for servicing a system load, the hybrid power source comprising a diesel engine and a battery, the computer program comprising instructions stored in the non-transitory computer readable medium that are executed by the processor, the computer program comprising, instructions to cause the load processor to determine a current system load serviced by power provided from the hybrid power source; instructions for the processor to determine a current operating state for the diesel engine and the battery; instructions for the processor to determine a new operating state for the diesel engine and the battery to reduce power consumption servicing the current system load the diesel engine and the battery; and instructions for the processor to replace the current operating state for the diesel engine and the battery to the new operating state for the natural gas engine, the diesel engine and the battery.

In another illustrative embodiment of the invention, the operating state comprises a load on the diesel engine, speed of the diesel engine and air fuel mixture supplied to the diesel engine, wherein the operating state further comprises torque of the diesel engine. In another illustrative embodiment of the invention, the computer program further comprises instructions to determine when the load requires additional power; instructions to connect the batteries to the bus for a period of 90 seconds when the load requires additional power; and instructions to connect additional generators to the bus during the 90 seconds.

In another illustrative embodiment of the invention, the computer program further comprises instructions to limit power demand until the additional generators are connected to the bus. In another illustrative embodiment of the invention, the computer program further comprises instructions to remover generators from the bus during low power demand from the load. In another illustrative embodiment of the invention, the computer program is an expert system.

What is claimed is:

1. A system comprising a hybrid power generation plant system for a tug boat, the system comprising:
    a plurality of diesel engines;
    an electrical bus switchably attached to the plurality of diesel engines,
    a battery switchably attached to the electrical bus;
    a load comprising a tug boat propulsion load attached to the electrical bus;
    a hybrid power source attached to the electrical bus for servicing a system load, the hybrid power source comprising a diesel engine and a battery;
    a processor attached to the diesel engine and the battery that executes a computer program of instructions stored in a non-transitory computer readable medium;
    a computer program comprising instructions stored in a non-transitory computer readable medium that are executed by the processor, the computer program comprising:
    instructions determining a current system load serviced by power provided from the hybrid power source;
    instructions to determine a current operating state for the diesel engine the operating state for the diesel engine comprising engine revolutions per minute (RPM), variable frequency of a supply voltage, torque, plot point on a speed torque curve for the diesel generator and the current operating state for the battery comprising percent charged to capacity, type of battery and plot point on a battery life to power output capacity curve for each battery type used in the system;
    instructions to determine a new operating state for the diesel engine and the battery to reduce power consumption servicing the current system load the diesel engine and the battery;
    instructions to replace the current operating state for the diesel engine and the battery to the new operating state for the diesel engine and the battery;
    instructions to determine when the load requires additional power;
    instructions to connect the batteries to the bus for a period of 90 seconds when the load requires additional power; and
    instructions to connect additional generators to the bus during the 90 seconds.

2. The system of claim 1, wherein the operating state comprises a load on the battery, a load on the diesel engine, speed of the diesel engine and air fuel mixture supplied to the diesel engine and torque of the diesel engine.

3. The system of claim 1, the computer program further comprising:
 instructions to limit power demand until the additional generators are connected to the bus.

4. The system of claim 1, the computer program further comprising:
 Instructions to add batteries to the bus during high power demand from the load.

5. The system of claim 1, the computer program further comprising:
 instructions to remove generators from the bus during low power demand from the load.

6. The system of claim 1, wherein the computer program is a neural network.

7. A method comprising:
 determining using a computer program a current system load serviced by power provided from a hybrid power source for servicing a system load, the hybrid power source comprising a diesel engine and a battery;
 determining a current operating state for the diesel engine and the battery;
  determining a new operating state for the diesel engine comprising engine revolutions per minute (RPM), variable frequency of a supply voltage, torque, plot point on a speed torque curve for the diesel Generator and the current operating state for the battery comprising percent charged to capacity, type of battery and plot point on a battery life to power output capacity curve for each battery type used in the system;
 replacing the current operating state for the diesel engine and the battery to the new operating state for the diesel engine, and the battery;
 connecting the batteries to a bus for a period of 90 seconds when the load requires additional power; and
 connecting additional generators to a bus during the 90 seconds.

8. The method of claim 7, wherein the operating state comprises a load on the diesel engine, speed of the diesel engine and air fuel mixture supplied to the diesel engine, wherein the operating state further comprises torque of the diesel engine.

9. The method of claim 7, further comprising:
 limiting power demand until additional generators are connected to a bus.

10. The method of claim 7, further comprising:
 removing generators from a bus during low power demand from the load.

11. The method of claim 7, wherein the computer program is a neural network.

12. A computer readable medium contain instructions that are executed by a processor comprising:
 a processor in data communication with a non-transitory computer readable medium to control a hybrid power source for servicing a system load, the hybrid power source comprising a diesel engine and a battery, a computer program comprising instructions stored in the non-transitory computer readable medium that are executed by the processor, the computer program comprising,
 instructions for the processor to determine a current operating state for the diesel engine and the battery; or the diesel engine the operating state for the diesel engine comprising engine revolutions per minute (RPM), variable frequency of a supply voltage, torque, plot point on a speed torque curve for the diesel generator and the current operating state for the battery comprising percent charged to capacity, type of battery and plot point on a battery life to power output capacity curve for each battery type used in the system;
 instructions for the processor to determine a new operating state for the diesel engine and the battery to reduce power consumption servicing the current system load the diesel engine and the battery;
 instructions for the processor to replace the current operating state for the diesel engine and the battery to the new operating state for the diesel engine, and the battery
 and
 instructions to determine when the load requires additional power;
 instructions to connect the batteries to a bus for a period of 90 seconds when the load requires additional power; and
 instructions to connect additional generators to the bus during the 90 seconds.

13. The medium of claim 12, wherein the operating state comprises a load on the diesel engine, speed of the diesel engine and air fuel mixture supplied to the diesel engine, wherein the operating state further comprises torque of the diesel engine.

14. The medium of claim 12, the computer program further comprising:
 instructions to limit power demand until additional generators are connected to a bus.

15. The medium of claim 12, the computer program further comprising:
 instructions to remove generators from a bus during low power demand from the load.

16. The medium of claim 12, wherein the computer program is an expert system.

\* \* \* \* \*